Nov. 10, 1936.                P. L. MYER                2,060,586
              AUTOMATIC TICKER TAPE FEED-OUT DEVICE
                        Filed May 23, 1935          3 Sheets-Sheet 1

INVENTOR
P.L.MYER
BY
Eugene E. Brown
ATTORNEY

Nov. 10, 1936.   P. L. MYER   2,060,586
AUTOMATIC TICKER TAPE FEED-OUT DEVICE
Filed May 23, 1935   3 Sheets-Sheet 2

INVENTOR
P.L. MYER
BY
Eugene E. Brown
ATTORNEY

Nov. 10, 1936.　　　　　P. L. MYER　　　　　2,060,586
AUTOMATIC TICKER TAPE FEED-OUT DEVICE
Filed May 23, 1935　　　3 Sheets-Sheet 3

INVENTOR
P.L.MYER
BY
Eugene C. Brown
ATTORNEY

UNITED STATES PATENT OFFICE 2,060,586

AUTOMATIC TICKER-TAPE FEED-OUT DEVICE

Percy L. Myer, Ozone Park, N. Y., assignor to The Western Union Telegraph Company, New York, N. Y., a corporation of New York Application May 23, 1935, Serial No. 23,104

20 Claims. (Cl. 178—42)

This invention relates, in general, to telegraph recording apparatus, and more particularly to step-by-step recorders.

One of the objects of the invention is to provide means for automatically feeding out blank tape whenever there is a predetermined period of rest in the transmission.

Another object is to provide adjustable means for controlling the amount of blank tape fed out by the automatic feed-out device.

A still further object is to provide an independent adjustment for each step-by-step recorder in a telegraph circuit, so that each one may feed out a different and predetermined amount of tape, according to its individual requirement.

With step-by-step tickers, as they are now constructed, the tape is stepped out of the ticker into view of the observer by having the operator transmit a sufficient number of letters dots. This is done so as to step out the last quotation or news item a few steps each time there is a period of rest in the transmission. By this manual means, the ticker-tape is advanced one step for each letter dot printed by the ticker. If the operator fails to introduce the letters dots to step out the tape a sufficient amount, the last few characters of a quotation or news item will be hidden from view. Very often, in such cases, the observer will pull the tape manually in order to see the last printed character, and in so doing will mutilate the tape. In all cases, it is essential to advance the tape a few steps so that the last printed character may be clearly seen.

Very often projectors are used to project the characters printed on the tape by the ordinary type of step-by-step recorder. It may readily be seen that the location of a printer relatively to the projector apparatus may make an appreciable difference in the amount of tape that must be fed out in order to bring the last printed character into view each time the transmission ceases. In operation, many such tickers having projectors associated therewith are operated from a single transmitter. It is apparent that, since all the tickers working from a given transmitter must step out the same amount of tape, whether for projector use or otherwise, there is a continuous waste of ticker tape on all tickers not used in combination with a projector.

Hence, a more specific object of the invention is to decrease the waste of ticker tape in all machines which do not require the maximum stepping out of tape and to eliminate the unnecessary additional work on the part of the operator of striking the letters dot key.

These and other objects are effected by the invention, as will be apparent from the following description and claims taken in connection with the accompanying drawings forming a part of this application, in which:

The invention is concerned with the well known, self winding step-by-step recorder but, of course, is not limited thereto.

Figure 1:
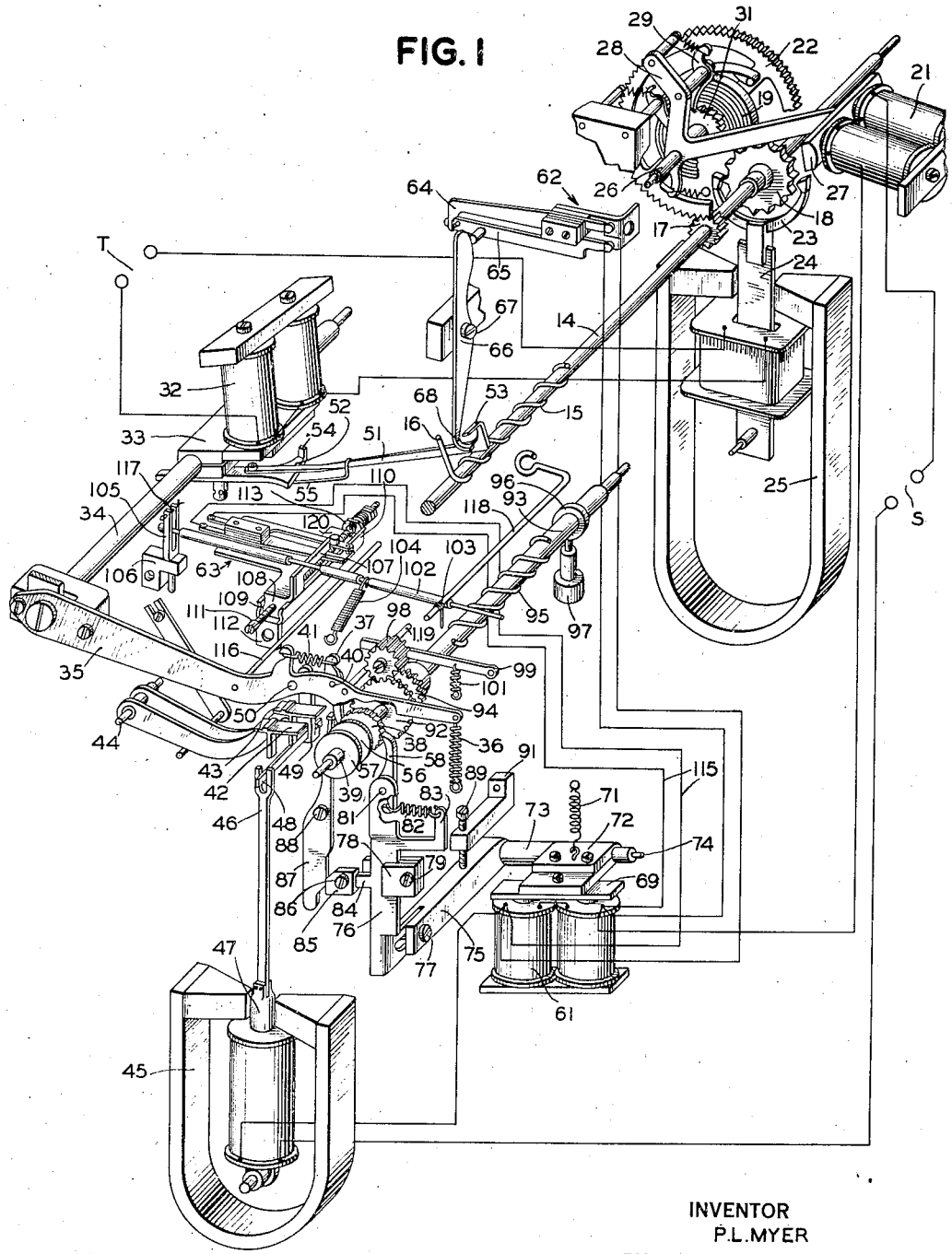
Fig. 1 is a schematic perspective view of a step-by-step self winding ticker embodying the present invention.

Referring now to Fig. 1, I have shown a schematic perspective view of the essential features of a step-by-step self winding ticker, in which the supporting members of the typewheels have been omitted for the sake of clearness and convenience of illustration.

The ticker employs two line wires for controlling its operation, commonly referred to as the type and shift wires, and designated by the letters T and S. The signals transmitted over the type wire T control the rotation of the type wheel shaft and the operation of the press or printing magnet. The signals transmitted over the shift wire S control the shift and winding mechanisms and also the tape stepping magnet.

Figure 2:
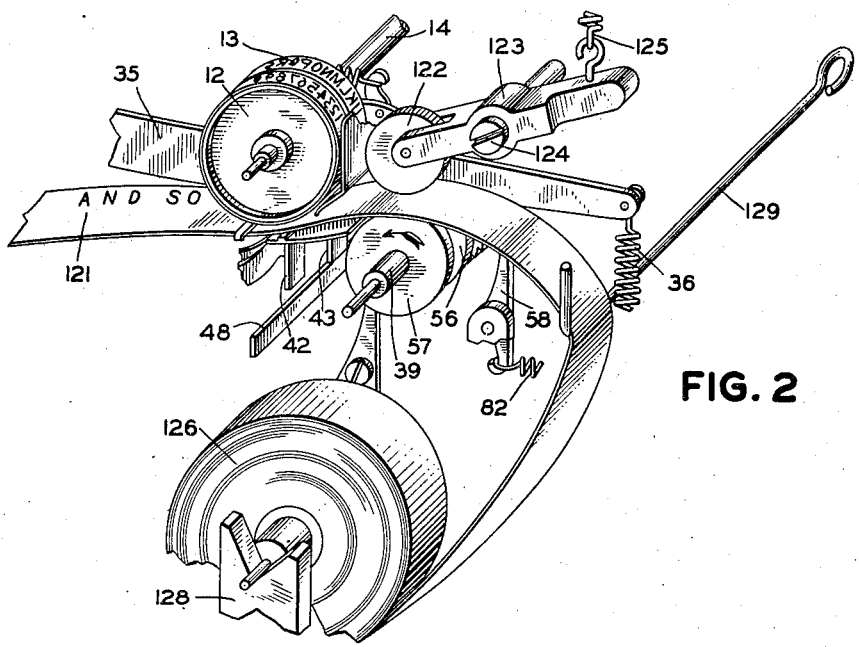
Fig. 2 is a perspective view of the typewheel and tape feed mechanism thereof.

The type, which produce the impression on the tape, are arranged on a pair of type wheels 12 and 13, shown in Fig. 2, rigidly mounted adjacent each other on the forward end of the typewheel shaft 14. Along the shaft 14, as shown in Fig. 1, are mounted a worm 15, having one end 16 projecting radially from the shaft; a gear 17, and an escapement-wheel 18. Both ends of the shaft are journaled in the framework of the ticker, which has been removed for clearness. The shaft 14 tends to rotate in a clockwise manner, due to energy stored up in a spiral spring 19 by the action of the winding magnet 21. This stored energy is transmitted to the type wheel shaft 14 by means of gears 17 and 22.

The escapement wheel 18 is prevented from rotating freely by means of an escapement anchor 23 which is fixed to the end of the armature 24 of a polarized escapement magnet 25.

Alternating current signals, coming over the type wire T, cause the escapement magnet armature 24, bearing the escapement anchor 23, to be pulled alternately from one pole of the escapement magnet to the other. The escapement wheel 18 is allowed to rotate one step for each movement of the anchor.

The power to drive the type-wheel shaft 14 is obtained from the spiral spring 19, having one end secured to a shaft 26. This spring is kept wound by the oscillating armature 27 of the winding magnet 21. The armature 27 is pivotally mounted on the shaft 26 and has an extending arm 28, attached to which is a pawl 29, engaging with a ratchet 31 attached to the shaft 26, adjacent the pivoted armature 27.

The oscillation of the winding magnet armature 27 is caused by a series of current pulses of either polarity produced by alternately opening and closing the shift circuit at the transmitting end of the line.

The printing mechanism comprises a press magnet 32 connected in series with the escapement magnet 25 in the type circuit T. The press magnet 32 has an armature 33, rigidly mounted on a shaft 34 having its ends suitably journaled in the framework. On the forward end of the shaft 34 is rigidly mounted a press lever 35, normally held down in its unoperated position by a spring 36.

Attached to the press lever 35 is a tape feed pawl 37, pivoted to the press lever at 40 and held in engagement with a ratchet wheel 38, mounted on a shaft 39, by the action of a spring 41 hooked from the press lever 35 to an extension of the pawl 37.

The alternating current signals coming over the type wire T and energizing the escapement magnet 25, must pass through the press magnet 32. However, they are too short to energize it sufficiently to move the press magnet armature 33. The press magnet is energized whenever a prolonged escapement pulse of either polarity is transmitted. The prolonged pulse holds the escapement anchor 23 in engagement with the escapement-wheel 18 until enough energy is built up to cause the armature 33, and with it the press lever 35, to rise against the action of the press spring 36. The first reversal of current, following the press energizing pulse, deenergizes the press magnet sufficiently to permit the press spring 36 to draw the armature back to its unoperated position.

Beneath each of the type-wheels 12 and 13 is placed a printing platen 42 and 43 pivoted at 44, which may be raised separately. Since there are two type-wheels, a figures and a letters typewheel, rotating together and having two characters in printing position, it is necessary to select one of the two. This selection is accomplished by means of a shift mechanism.

The shift mechanism comprises a polarized shift magnet 45 having a shift fork 46 attached to its armature 47. This fork engages with a press bar 48 which is fixed into a swinging frame 49 attached to the press lever 35 by a pivot 50. The polarity of the current in the shift circuit determines whether the press bar 48 is moved under the heel of the letters or figures platen. The shift and winding magnets 45 and 21 are in series and the winding circuit is automatically closed when a printing pulse is transmitted, so that the shift magnet may cause the shift fork to move the press bar under the selected platen.

It is necessary that the type-wheel shaft 14 rotate one step for each escapement impulse to keep the type-wheels in step with the transmitted impulses. In order to keep all tickers synchronized a device is provided which automatically runs the ticker to unison after a predetermined number of characters have been transmitted.

This mechanism comprises a lever 51 pivoted on a plate 52 attached to the armature 33 of the press magnet 32. The free end of the lever 51 engages with the worm 15 on the type-wheel shaft 14. As the type-wheel rotates the unison lever 51, which is in engagement with the worm 15, is carried along by the worm until its extended end 53 engages with the radially extending free end 16 of the worm. When this takes place the type-wheel shaft 14 is held in such a position that the unison dot is directly over the letters printing platen 43.

Each time the press magnet 32 is energized, the unison lever 51 is disengaged from the worm 15 and is caused to return to its start position against a stop 54, by means of a spring member 55. While printing, the unison lever is kept close to its start position on the worm because the press magnet is being energized frequently. When no press pulses are transmitted the type-wheel will make three complete revolutions until the unison lever 51 engages the free end of the unison worm, thus stopping the rotation of the type-wheel shaft. This occurs on all printers in the circuit, so that they all stop in the same position. As stated, this will be with the unison dot, on all machines, in printing position. When the transmission commences again, a press pulse must be sent over the line, thus making the first character printed on each machine the unison dot. By this means all the ticker type-wheels are started in synchronism with the transmitter.

The tape is shown in feeding position under the type wheels in Fig. 2, the tape, type-wheels and pressure feed roller in Fig. 1 being omitted to enable the feed mechanism to be more clearly seen. The feed mechanism consists of a feed wheel 56 mounted on the shaft 39. Forward of the feed wheel 56, is a guide wheel 57 and behind the feed wheel there is the ratchet-wheel 38.

Each time the press magnet is energized with a prolonged pulse, the press lever 35 is drawn up against the action of the spring 36. This causes the press bar 48 to rise and strike the proper platen so as to print the selected character on the tape, and also lifts the feed pawl 37 up so that it engages a new tooth on the tape feed ratchet-wheel 38. Upon a reversal of current in the magnet 32, the press lever 35 is drawn down by the spring 36, causing the ratchet-wheel 38, and with it the tape feed wheel 56, to be stepped ahead so as to feed the tape forward into position for the printing of the next character. The mechanism so far described is well known in the art and forms no part of the present invention, except insofar as it cooperates with the parts now to be described.

The automatic feeding out of the tape is accomplished by means of a tape stepping magnet 61, connected in the shift circuit in series with the winding magnet 21 and the shift magnet 45. The winding terminals of this magnet are also connected to two contact assemblies 62 and 63. Assembly 62 contains the start contact, and assembly 63 the stop contact for the magnet 61.

Contact assembly 62 consists of a pair of spring contacts 64 and 65, which are normally closed, thus shunting out the tape-stepping magnet 61 and making it unresponsive to the winding impulses. Engaging contact 65 is the upper end of a lever 66, pivoted at 67 to the framework of the ticker. The lower end of the lever 66 is curved outwardly, its curved end 68 lying in the path of the unison lever 51 as it approaches the free end 16 of the worm 15. Just before the unison lever engages its stop 16, it engages with the lever 66, pushing the contact 65 out of engagement with contact 64. This removes the short circuit from the winding of the tape stepping magnet 61, and the winding pulses coming steadily over the shift circuit cause the armature 69 of the magnet 61 to be alternately drawn down against the action of a spring 71, and released.

The armature 69 of the tape stepping magnet 61 is securely attached to an armature bracket 72, clamped to a bearing rod 73, which is free to turn on its pivot points 74, fitted into the framework, not shown. The armature bracket 72 is provided with an extension arm 75, the forked end of which is held in engagement with the forked portion of a slide member 76, by means of a shoulder screw 77. The tape feed slide 76 is arranged to slide freely up and down in a guide 78, which is secured to the framework by means of a screw 79. The upper end of the slide 76 carries the pawl 58 attached to it by a shoulder screw 81. This pawl is held in engagement with the ratchet wheel 38 by a spring 82 which is hooked onto an extension 83 on the right side of the tape feed slide 76. On the left side of the slide 76 is an extension 84 adapted to carry an adjustable shoe 85, secured to it by a set screw 86.

When the slide 76 is in its upper, or normal, position, as shown, the shoe 85 engages with the lower end of a pawl limiting lever 87, pivoted on a shoulder screw 88. This serves to hold the upper end of the lever 87 in a fixed position with regard to the feed pawl 37 and the tape feed ratchet-wheel 38.

When the ticker is printing characters, the slide 76 is held in its upper position by the action of spring 71, the upward movement of the armature bracket extension 75 being limited by the screw 89, which is held by a bracket 91 secured to the framework of the ticker. Under regular printing operation, the tape is advanced one step for each character printed, by the action of pawl 37 engaging the ratchet-wheel 38, each time the press lever 35 is lowered. The forward movement of the ratchet-wheel 38 is limited by the upper end of the lever 87, so as to prevent overthrow when the ticker is printing characters. The ratchet-wheel is retained by pawl 58 to prevent reversal of its movement.

As soon as the transmission of printing signals stops, and the type-wheel shaft 14 makes three complete revolutions, opening contacts 64 and 65 in the start contact assembly 62, the tape stepping magnet 61 starts to work, moving the slide 76 down and up. As the slide is drawn down, the pawl 58 engages a lower tooth on the ratchet-wheel 38. At the same time the shoe 85 is drawn down out of blocking engagement with the pawl limiting lever 87. When the slide 76 rises under the action of spring 71, the tape feed ratchet-wheel 38 is moved ahead one step by pawl 58 until it is stopped by the action of the shoe 85 tipping the upper end of the lever 87 against the pawl 37 just before the bracket extension arm 75 comes to rest against its limiting screw 89. This causes the upper end of lever 87 to press against the pawl 37. This operation is repeated until the tape stepping is completed. It will be noted that the pawl 37, pivoted on the press lever 35, now acts as a retaining pawl while pawl 58 is the feeding pawl. The first press impulse coming over the type wire, following the unison operation, lifts the pawl 37 out of engagement with the ratchet-wheel 38 and the limiting lever 87, allowing the slide 76 to take its normal position as determined by the screw 89.

A tape measuring mechanism for determining the amount of tape advanced by the magnet 61, will now be described. It consists, briefly, of the stop contact assembly 63, an adjustable measuring carriage for determining the amount of tape to be fed out, and a measuring worm for controlling the contacts of assembly 63.

It will be recalled that the tape feed ratchet-wheel 38, the tape feed wheel 56, and the tape guide wheel 57, are secured to the shaft 39, which has pivots on each end, and is arranged to turn in bearing screws secured to the framework. Also rigidly attached to the shaft, behind the press lever 35, is a gear 92. Mounted freely on the shaft 39, behind the gear 92, is a sleeve 93, carrying a gear 94, a worm 95, a collar 96, and a weight 97 attached to a radially extending pin fitted into the collar 96.

When the press lever 35 is down in its unoperated position, the two gears 92 and 94 are coupled together by means of a gear 98, mounted on an arm 99, which is pivoted at its other end. The gear 98 is held in mesh with gears 92 and 94 by means of a spring 101. Thus, as the tape stepping magnet 61 is operating to feed out the tape, the measuring sleeve 93, which is coupled to the feed wheel shaft 39, will turn also. As the sleeve 93 turns, the worm 95, engaging one end of a rod 102, causes the rod to be moved away from its stop limit 103, against which it is normally held by means of a spring 104, towards the farther end of the sleeve 93.

The opposite end of the rod 102 is loosely fitted into a fork 105, pivoted in a bracket 106, mounted on the ticker frame. A section of the middle portion of the rod 102 has a smaller diameter, and is adapted to rest on a horizontally extending arm 107, disposed transversely beneath the rod. This arm 107 is part of the stop contact assembly 63, and is carried by a movable carriage 108 resting in a channel 109 attached to the frame by a lug 112. A pair of normally open contacts 110 are mounted on an extension of the carriage 108 and serve, when closed, to shunt out the tape stepping magnet 61. The carriage 108 is adjustably mounted in its channel, to vary the position of the contacts 110 relatively to the rest position of the rod 102, by means of a screw 111 threaded through the base of the carriage. The screw is threaded through the carriage, and at its farther end also passes through a turned up portion 113 of the carriage channel 109. Here it is held for free rotative motion by any suitable means, as a washer and pin on one side, and a spring with locknuts on the other. By means of the screw 111, the carriage may be moved forward or back so as to regulate the amount of travel of the rod 102 along the arm 107 before engaging the contacts 110.

As the rod 102 is moved along in engagement with the worm 95 on the sleeve 93, the rod reaches the farther end of the guide arm 107, and is pulled down, by the action of the spring 104, against the insulating button 120 on the upper spring of contacts 110. This causes the contacts 110 to close, thereby shunting the winding of the tape stepping magnet 61 through conductors 115 and stopping the advancement of the tape.

The subsequent transmission of a press impulse serves a double purpose. First, it raises the unison lever 51 out of engagement with the unison worm 15, and it is carried back to its start position against the stop 54 by means of the spring member 55. This allows the contacts 64 and 65 to become engaged again, shunting out the winding of the tape stepping magnet 61. Second, it lifts the rod 102 from engagement with the insulating button 120 by means of a lifting rod 116, secured to the press lever 35. This allows the contacts 110 to open. As the back end of the rod 102 strikes the limit pin 117 in the fork 105, the front end of the rod is lifted from engagement with the worm 95 and the rod 102 is drawn back along a guide rod 118 to its start position against its stop 103 by the action of spring 104.

The raising of the press lever 35 also causes a letters dot to be printed, and, in addition, lifts the gear 98 out of engagement with the gears 92 and 94, by means of a lifting rod 119, secured to the press lever 35, and projecting under the lever 99, on which the gear 98 is mounted. When the gear 98 is lifted out of engagement with the gears 92 and 94, the sleeve 93 is freed on the shaft 39, and is returned to its normal position by the weight 97 attached to the collar 96. This weight causes the sleeve to have a fixed starting position, so that the rod 102 will always start its measuring function from the same point regardless of the position of the shaft 39.

Should the ticker commence to print while the tape is being automatically advanced, the tape feeding will cease because the raising of the press lever will return the various parts to their normal position.

Referring now briefly to Fig. 2, I have shown the position of the type-wheels and tape, and the pressure feed roller, which parts were removed in Fig. 1 for the sake of clearness.

The tape 121 is passed between the feed wheel 56 and the pressure roller 122 mounted on a lever 123, which pivots on a screw 124, and is caused to press against the tape by the action of a spring 125. The tape is supplied from a roll 126 and is threaded over a take-up spring 129, then between the tape feed wheel 56 and the pressure roller 122, and then between the type-wheels 12 and 13 and the printing platens 42 and 43.

Figure 3:
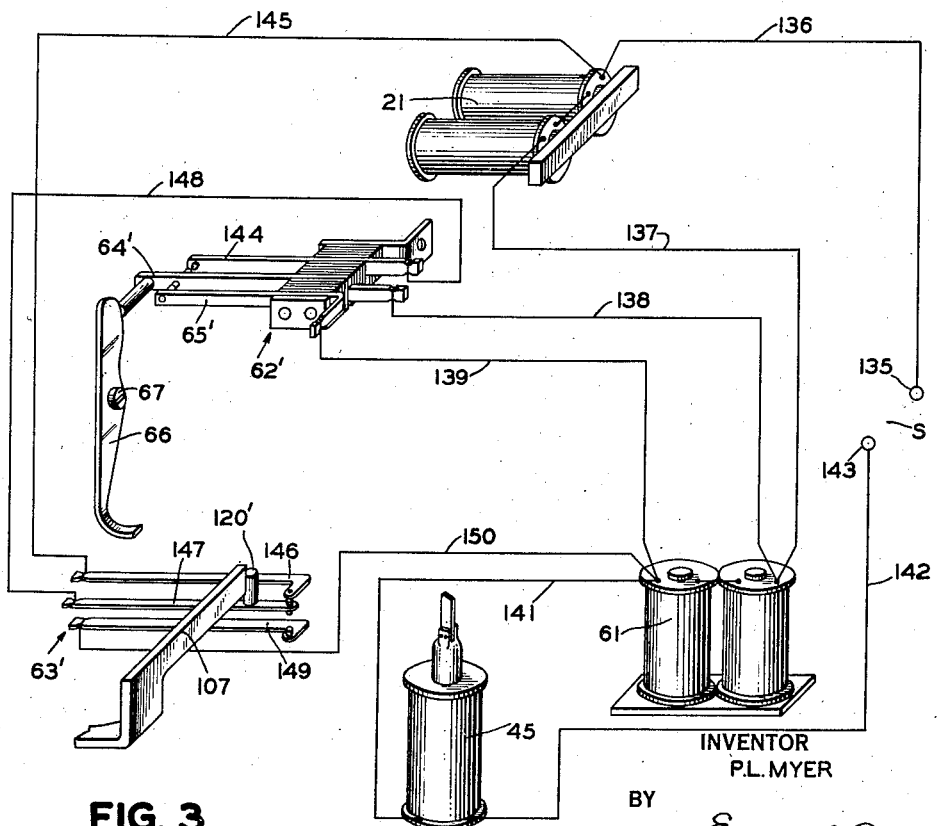
Fig. 3 is a schematic view showing a method of cutting out the winding magnet circuit whenever the tape stepping mechanism is operating.

Referring to Fig. 3, I have shown a method of controlling the operation of the tape-stepping magnet 61 so that, when it is operating, the winding magnet 21 is shunted out, and when the tape stepping is completed, the winding function is restored. This arrangement maintains a constant load on the shift circuit and gives full power for feeding, when feeding is being done. In this arrangement, the start and stop contact assemblies 62 and 63 have been changed so as to provide three spring-contact elements in each. These are designated in Fig. 3 as 62' and 63'. The shift circuit alone is shown and is modified from the form shown in Fig. 1.

When the ticker is printing characters, the shift circuit in the ticker is from terminal 135, over conductor 136 to the winding magnet 21, through the winding magnet and over conductor 137 to one terminal of the stepping magnet 61. From this terminal the circuit is continued over conductor 138, through contacts 64' and 65', conductor 139 to the other terminal of magnet 61, thence over conductor 141 to the shift magnet 45, through this magnet and by way of conductor 142 to the other shift circuit terminal 143. Under the above conditions the winding magnet 21 and the shift magnet 45 are connected in series in the shift circuit.

When the type-wheel shaft has made three revolutions, for restoring the mechanism to unison, the start contact lever 66 pushes the contact 64' out of engagement with contact 65', and into engagement with contact 144. Now the circuit is from terminal 135, over conductor 136 and 145, through contacts 146 and 147 on the stop contact assembly 63', over conductor 148 to the start contact assembly 62', through contacts 144 and 64', over conductor 138, through the tape stepping magnet 61, over conductor 141, through shift magnet 45, and over conductor 142 to terminal 143. With this circuit the tape stepping magnet 61 and the shift magnet 45 are connected in series in the shift circuit. The winding magnet 21 is now shunted out.

When the tape has been fed out the predetermined amount, the rod 102, shown in Fig. 1, reaches the end of the guide 107, at which point it is drawn down into engagement with the insulating button 120' on contact 147. This opens contacts 146 and 147 and closes contacts 147 and 149. This action opens the short circuit on the winding magnet 21 and shunts out the tape stepping magnet 61. The short circuit around the magnet 61 is as follows: Terminal 135, conductor 136, magnet 21, conductor 137, conductor 138, contacts 64' and 144, conductor 148, contacts 147 and 149, conductor 150, conductor 141, magnet 45, and conductor 142, to terminal 143. Thus the tape stepping function is stopped, and the winding is resumed.

The shift circuit now has the winding and shift magnets in series, as at first, but both the start and stop contacts are in their operated position. The first press impulse coming over the line restores the contacts to their normal position, and the shift and winding magnets still remain in series.

Figure 4:
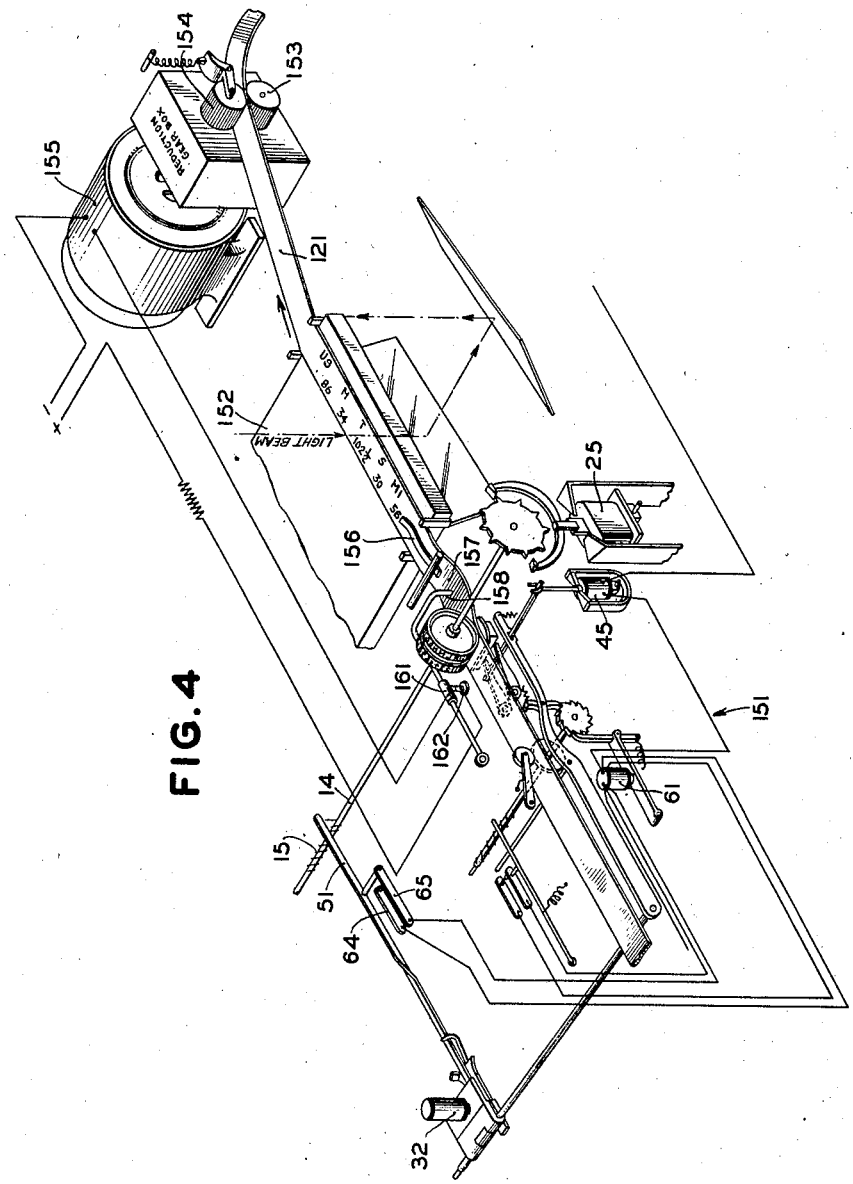
Fig. 4 is a perspective view showing the automatic feed out device used in combination with a projector and tape puller.

In Fig. 4 is shown a schematic perspective view of the essential parts of a step-by-step recorder used in combination with a projection system, such as that shown in the patent to R. F. Dirkes, No. 1,684,309, issued Sept. 11, 1928.

The tape 121 is fed out from the step-by-step recorder, generally indicated at 151, and passes over the flat surface of a glass support or plate 152 forming a part of the projection system. The tape is pulled across the table by passing it between gripping rollers 153 and 154, the roller 153 being positively connected through reduction gearing to the shaft of the electric driving motor 155, and the roller 154 acting as a pressure roller. These gripping rollers hold the tape firmly, whenever the motor stops, so that the tape cannot slip backward.

A leaf spring member 156, suitably carried by the framework, is positioned centrally between the rows of printed characters so that it presses the tape against the plate 152. The tape must therefore be pulled across the table against the pressure exerted by the spring member 156. This spring member serves to keep a tension at all times on the strip of tape between it and the gripping rollers 153 and 154 of the tape-pulling motor.

The reduction gearing of the tape-pulling motor is such that the tape will be pulled across the table at substantially the same rate of speed as it is normally fed from the recorder.

Intermediate the recorder and spring member 156 on the projection table, a certain amount of slack is maintained in the tape, forming a loop 157. A predetermined minimum loop is obtained by having the free end of a pivoted contact lever 158 riding on the surface of the tape in the bottom of the loop. Whenever the recorder stops or slackens its speed, the loop will decrease and the lever 158 will be lifted, thereby opening switch contacts 161 and 162 in the motor circuit. Since there is a gradual deceleration of the motor, the tape will not stop with a jerk, but will gradually come to rest.

As soon as the transmission of printing signals stops and the type wheel shaft 14 makes three complete revolutions, the contacts 64 and 65 are opened, thus starting the operation of the tape-stepping magnet 61. By regulating the adjusting screw 111, shown in Fig. 1, sufficient tape may be stepped out to bring the last printed character into projecting position on the glass plate 152.

Whenever there is a substantial loop in the tape, due to the fact that the recorder has been advancing the tape faster than it can be taken up by the tape puller, the timing function of lever 51, engaging the worm 15 on the type-wheel shaft 14, may be performed, and the contacts 64 and 65 may be opened before the loop has decreased sufficiently to open contacts 161 and 162. In that case the tape stepping magnet 61 will commence operating before the motor of the pulling mechanism has been switched off. Hence, the tape will be continuously fed without any interruption until the last character is in projecting position. However, should the loop 157 be almost its predetermined minimum size when the transmission of printing signals ceases, the contacts 161 and 162 will be opened before the timing function of the lever and worm, 51 and 15, has been performed. This will cause the motor to be shut off and the moving tape will gradually come to rest. As soon as lever 51 engages contacts 64 and 65, the tape stepping magnet begins to operate and the recorder feeds out blank tape until the loop 157 is large enough to permit contacts 161 and 162 to close. The tape puller then begins to operate again until the predetermined amount of tape has been drawn across the projector plate 152. When the automatic feedout magnet 61 ceases to operate, the loop 157 decreases and the tape pulling mechanism is again rendered inoperative.

Thus, from the above description, it will be seen that I have provided means for automatically stepping out blank tape on a step-by-step printer each time the type-wheel shaft has made three complete revolutions, without a printing impulse having been sent over the type circuit. This obviates the necessity of the operator manually pressing the letters dot key on the transmitter so as to step the tape forward. An adjustable device for automatically measuring out a predetermined amount of tape has also been provided. By means of this, it is possible to adjust each printer in the circuit to step out a different and predetermined amount of tape, according to its individual need. This eliminates the waste of tape that has heretofore been necessary each time a projector was used in connection with one or more of the tickers in service. I have also provided means for automatically cutting out the tape stepping magnet, and restoring the normal operation of the ticker whenever printing signals are sent over the type wire before the tape stepping magnet has completed its function.

While this invention has been shown in but one form, it will be obvious to those skilled in the art that it is not so limited but is susceptible to various changes and modifications without departing from the spirit thereof and it is desired, therefore, that only such limitations shall be placed thereon as are imposed by the prior art or are specifically set forth in the appended claims.

What is claimed is:

1. In a telegraph recorder, a selecting mechanism operable from received telegraphic impulses, a printing mechanism controlled by said selecting mechanism, a record strip, a ratchet and a pawl cooperating with said printing mechanism for feeding the strip forward one space after each printing operation, an auxiliary pawl cooperating with said ratchet for advancing said strip forward a predetermined distance whenever said printing mechanism has ceased to function for a predetermined interval, a timing device for measuring said interval, means cooperating with said timing device for automatically causing the co-operative engagement of said auxiliary pawl with said ratchet upon the completion of said interval, a measuring device co-acting with said ratchet for measuring the length of the strip as it is advanced, and means for automatically discontinuing the operation of said auxiliary pawl when the strip has been advanced said predetermined distance.

2. In a telegraph recorder, a selecting mechanism operable from received telegraphic impulses, a printing mechanism controlled by said selecting mechanism, a record strip, a spacing mechanism cooperating with said printing mechanism for feeding the strip forward one space after each printing operation, an auxiliary feed mechanism for feeding the strip forward a predetermined distance whenever said printing operations have ceased for a predetermined interval, a circuit for said auxiliary feed mechanism comprising an electromagnet responsive to current pulses, a contact for conditioning said circuit for operation, mechanical means co-acting with said electromagnet for feeding the strip forward, adjustable means for measuring the length of strip to be fed out, and means operable upon the completion of said measuring operation for rendering said magnet inoperative.

3. In a telegraph recorder, a selecting mechanism responsive to received telegraphic impulses, a timing device, a printing mechanism controlled by said selecting mechanism, a record tape, a main feed mechanism cooperating with said printing mechanism for stepping the tape forward one space after each printing operation, an auxiliary feed mechanism for automatically feeding the tape forward a predetermined distance whenever the printing operations have ceased for a predetermined interval, said mechanism comprising a circuit, an electromagnet responsive to current impulses and cooperating mechanically through its armature with said main feed mechanism, said magnet being normally unoperated, a start contact actuated by said timing device to render said magnet responsive to the current impulses in said circuit, a measuring device controlled by said auxiliary feed mechanism for measuring the length of tape to be fed out, a stop contact operable upon the completion of said measuring operation, for rendering said magnet inoperative, and means for automatically discontinuing the operation of the auxiliary feed mechanism and restoring the normal operation of the main feed mechanism when printing starts before the predetermined length of tape has been fed out.

4. In a printing telegraph machine, a printing mechanism, a paper strip, a unison device, a main paper feed mechanism actuated at each printing operation to feed the paper forward, an auxiliary paper feed mechanism controlled by said unison device for feeding the paper forward a predetermined distance whenever the printing operations have ceased for a predetermined interval, and means cooperating with said printing mechanism for discontinuing the operation of the said auxiliary paper feed mechanism and restoring the normal operation of said main paper feed mechanism whenever printing starts before the predetermined length of tape has been fed out.

5. In a telegraph recorder, a selecting mechanism operable from received telegraphic impulses, a printing mechanism controlled by said selecting mechanism, a record strip, a spacing mechanism cooperating with said printing mechanism for feeding the strip forward in the direction of its length one space for each printing operation, an auxiliary spacing mechanism for stepping out said strip a predetermined plurality of spaces whenever said printing operations have ceased for a predetermined interval, a unison device for determining said interval, means for automatically starting the operation of said auxiliary spacing mechanism, and means co-acting with said auxiliary spacing mechanism for discontinuing its operation.

6. In a telegraph recorder, a selecting mechanism responsive to received telegraphic impulses, a timing device, a printing mechanism controlled by said selecting mechanism, a record tape, a main spacing mechanism cooperating with said printing mechanism for stepping the tape forward one space after each printing operation, an auxiliary feed mechanism for automatically feeding the tape forward a predetermined distance whenever the printing operations have ceased for a predetermined interval, said latter mechanism comprising a circuit, an electromagnet in said circuit cooperating mechanically through its armature with said main spacing mechanism, a start contact in said circuit actuated by said timing device to render said magnet operative, a second timing and measuring device controlled by said auxiliary feed mechanism for measuring the length of tape to be fed out, a stop contact for rendering said magnet inoperative, and means for automatically discontinuing the operation of said auxiliary feed mechanism whenever printing starts before the predetermined length of tape has been fed out.

7. In a telegraph system for step-by-step recorders, a printing mechanism, a paper strip, a timing device, a main paper feed mechanism actuated at each printing operation to feed the strip forward one letter space, an auxiliary paper feed mechanism comprising an electromagnet, a source of current impulses, a normal open contact in circuit with said source, means cooperating with said timing device for closing said contact for supplying current impulses to said magnet, means actuated by said magnet to step the strip forward in the direction of its length, and means for discontinuing the operation of said auxiliary feed mechanism after a predetermined operation thereof.

8. In a telegraph recorder, a selecting mechanism responsive to received telegraphic impulses, a timing device, a printing mechanism controlled by said selecting mechanism, a record tape, a main spacing mechanism cooperating with said printing mechanism, an auxiliary spacing mechanism for automatically feeding the tape forward a predetermined distance independently of said main spacing mechanism, mechanical means co-acting with said timing device for rendering said auxiliary spacing mechanism operative, a second timing or measuring device controlled by said auxiliary feed mechanism for measuring the length of tape to be fed out, and means operable upon the completion of said measuring operation for rendering said auxiliary spacing mechanism inoperative.

9. In a printing telegraph machine, a selecting mechanism responsive to received telegraphic impulses, a timing device, a printing mechanism, a paper strip, a main paper feed mechanism, an auxiliary paper feed mechanism, means cooperating with said timing device for automatically starting the operation of the said auxiliary paper feed mechanism and means coacting with said main feed mechanism to stop the operation of said auxiliary feed mechanism.

10. In a printing telegraph machine, a selecting mechanism, a timing device, a printing mechanism, a paper strip, a main paper feed mechanism, an auxiliary paper feed mechanism comprising electro-responsive means cooperating with said main feed mechanism to feed said paper strip forward in the direction of its length, means actuated by said timing device for rendering said electro-responsive means operable, measuring means coacting with said auxiliary feed means for controlling the feeding out of a predetermined length of strip, and means supervening the operation of said last mentioned means for rendering said electro-responsive means inoperative.

11. The combination with a step-by-step tape printing telegraph machine of an auxiliary spacing mechanism, operable from a common electro-responsive source with said telegraph machine, including an electro-magnet, means for rendering said magnet responsive to current impulses from said common source, a timing device having adjustable means for automatically measuring the length of tape to be fed out, and means for discontinuing the operation of said auxiliary spacing mechanism at any time.

12. In a printing telegraph machine, a selecting mechanism, a unison device, a printing mechanism, a record tape, a main feed, an auxiliary paper feed, a measuring or timing device cooperating mechanically with said auxiliary feed mechanism for feeding out a predetermined length of tape, means for interrupting the operation of said auxiliary feed mechanism whenever printing starts, and means for returning the various parts of said measuring mechanism to their normal or start position.

13. In combination, a telegraph recorder adapted to eject a tape therefrom, a support, means for advancing said tape across said support, auxiliary tape advancing means, and means, operable a predetermined time after printing signals have ceased, for causing said auxiliary tape advancing means to advance the last printed character to a predetermined position on said support.

14. In combination, a telegraph recorder having tape ejecting means for advancing said tape after each printing operation, a support for said tape, means for drawing said tape across said support, means for forming a loop in said tape intermediate said recorder and tape support, means operated by the variations in said loop to control said tape drawing means, and auxiliary tape ejecting means cooperating with said main ejecting means for advancing said tape a predetermined distance after the transmission of said printing signals has ceased.

15. In combination, a telegraph recorder adapted to intermittently eject tape therefrom, a support for said tape, means operable upon the completion of each printing operation for advancing the tape one letter space, means for forming a loop in said tape, means for pulling the tape across said support, means controlled by the variations in said loop for rendering said tape pulling means operative, and auxiliary tape advancing means responsive to telegraphic impulses for automatically advancing said tape a predetermined distance whenever printing operations have ceased for a predetermined interval.

16. In combination, a telegraph recorder adapted to intermittently eject tape therefrom, a support for said tape, means operable upon the completion of each printing operation for advancing the tape one letter space, a loop in said tape, means for pulling said tape across said support, contact means operated by the variations in said loop for controlling the operation of said tape pulling means, a tension device to exert a braking effect on said tape, and auxiliary tape advancing means responsive to telegraphic impulses for automatically increasing said loop whenever printing operations have ceased for a predetermined interval, whereby said contact means is actuated by the loop to render said tape-pulling means operative.

17. In combination, a telegraph recorder, means for feeding tape therefrom, a support for said tape, means for pulling said tape across said support, a tension device to exert a braking effect against the action of said tape puller, a loop in said tape intermediate said recorder and tension device, means for maintaining a minimum of slack in said tape comprising electric contacts responsive to variations in said loop for controlling said tape pulling means, auxiliary tape feeding means for maintaining the slack in said loop, said auxiliary means causing the tape to continue advancing after printing signals have ceased until the last printed character is brought to a predetermined position on said support.

18. In a step-by-step telegraph recorder, a circuit, a source of current impulses, a function magnet in said circuit, a main tape advancing mechanism, auxiliary tape advancing means, comprising a magnet in circuit with said function magnet, for automatically advancing the tape, and means for temporarily rendering said function magnet unresponsive to said current impulses.

19. In a step-by-step telegraph recorder, a main tape advancing mechanism operable upon the completion of each printing operation, an auxiliary tape advancing mechanism for automatically advancing the tape a predetermined distance whenever the transmission of printing impulses has ceased for a predetermined interval, a timing device for measuring said predetermined interval, a winding mechanism, and means for rendering said winding mechanism inoperative while said auxiliary tape advancing mechanism is being operated.

20. In a self-winding telegraph recorder, a circuit including a winding magnet responsive to received current impulses, a main tape advancing mechanism, an auxiliary electro-responsive tape advancing mechanism, normally unresponsive to said current impulses, means for rendering said auxiliary mechanism operative, means for automatically shunting out said winding magnet whenever said auxiliary mechanism is operating, a measuring device for measuring the length of tape to be fed out, means operable upon the completion of said measuring operation for rendering said auxiliary mechanism inoperative, means for automatically discontinuing the operation of the auxiliary tape advancing mechanism when printing starts before the predetermined length of tape has been fed out, and means for restoring said winding magnet to said circuit whenever said auxiliary mechanism has ceased to operate.

PERCY L. MYER.